United States Patent
Zhao

(10) Patent No.: US 8,406,147 B2
(45) Date of Patent: *Mar. 26, 2013

(54) METHOD AND APPARATUS FOR SOLICITING CONNECTIVITY FROM WIRELESS DATA NETWORKS

(75) Inventor: Wen Zhao, Kanata (CA)

(73) Assignee: Research In Motion Limited, Waterloo, ON ( * ) Notice: Subject to any disclaimer, the term of this patent is extended or adjusted under 35 U.S.C. 154(b) by 273 days.

This patent is subject to a terminal disclaimer.

(21) Appl. No.: 12/892,450

(22) Filed: Sep. 28, 2010

(65) Prior Publication Data

US 2011/0013535 A1    Jan. 20, 2011

Related U.S. Application Data

(63) Continuation of application No. 10/898,315, filed on Jul. 26, 2004, now Pat. No. 7,826,478.

(51) Int. Cl.
*H04J 3/14* (2006.01)
(52) U.S. Cl. ...................................................... 370/252
(58) Field of Classification Search .................. 370/229, 370/230, 232, 241, 252
See application file for complete search history.

(56) References Cited

U.S. PATENT DOCUMENTS

| | | | |
|---|---|---|---|
| 6,088,600 A | 7/2000 | Rasmussen | |
| 6,212,175 B1 | 4/2001 | Harsch | |
| 6,377,790 B1* | 4/2002 | Ishii | 455/343.1 |
| 6,424,639 B1* | 7/2002 | Lioy et al. | 370/338 |
| 6,738,373 B2* | 5/2004 | Turner | 370/352 |
| 7,139,246 B2* | 11/2006 | Harris et al. | 370/252 |
| 7,249,024 B2* | 7/2007 | Engstrom | 704/270 |
| 7,301,950 B1 | 11/2007 | Cheong et al. | |
| 7,334,126 B1 | 2/2008 | Gilmore et al. | |
| 7,454,634 B1* | 11/2008 | Donovan et al. | 713/322 |
| 7,558,196 B2* | 7/2009 | Bi et al. | 370/230 |
| 7,746,774 B2* | 6/2010 | Xue et al. | 370/230 |
| 2002/0132607 A1 | 9/2002 | Castell et al. | |
| 2002/0167905 A1 | 11/2002 | Wenzel et al. | |
| 2004/0017792 A1 | 1/2004 | Khaleghi et al. | |
| 2004/0032844 A1 | 2/2004 | Lewis et al. | |
| 2004/0179492 A1* | 9/2004 | Zhang et al. | 370/331 |
| 2005/0021770 A1 | 1/2005 | Helm et al. | |
| 2005/0063304 A1 | 3/2005 | Sillasto et al. | |

(Continued)

FOREIGN PATENT DOCUMENTS

| | | |
|---|---|---|
| WO | 03/040735 | 5/2003 |
| WO | 2004/014035 | 2/2004 |
| WO | 2004/056142 | 7/2004 |

*Primary Examiner* — Chi Pham
*Assistant Examiner* — Robert Lopata
(74) *Attorney, Agent, or Firm* — Moffat & Co.

(57) ABSTRACT

According to the embodiments of the techniques of this application, a wireless data device or other data node sends solicitation messages periodically to a wireless gateway, such as a PDSN, when there is no data traffic between the wireless data device and a wireless data network. Each solicitation message resets the simple IP inactivity timer on the wireless gateway. When multiple wireless data devices send solicitation messages, the interval between subsequent transmissions of solicitation messages is randomized to reduce the probability of collision with the solicitations from other devices on the same wireless link. The solicitation timer, for instance, may be based on the simple IP inactivity timer setting on the wireless network, and the number of wireless data devices that the wireless data network serves. Expiration of the solicitation timer at the wireless data device or other data node causes the next solicitation message to be sent from or on behalf of the wireless data device.

24 Claims, 7 Drawing Sheets

U.S. PATENT DOCUMENTS

| | | |
|---|---|---|
| 2005/0108390 A1 | 5/2005 | Nickerson et al. |
| 2005/0111377 A1 | 5/2005 | Lioy et al. |
| 2005/0111457 A1 | 5/2005 | Kumar et al. |
| 2005/0254475 A1 | 11/2005 | Kubler et al. |
| 2006/0002358 A1 | 1/2006 | Ray et al. |
| 2006/0018290 A1* | 1/2006 | Zhao .............................. 370/335 |

* cited by examiner

METHOD AND APPARATUS FOR SOLICITING CONNECTIVITY FROM WIRELESS DATA NETWORKS

CROSS REFERENCE TO RELATED APPLICATION

The present disclosure is a continuation of U.S. patent application Ser. No. 10/898,395, filed Jul. 26, 2004, the entire contents of which are incorporated herein by reference.

BACKGROUND

1. Field of Technology

This application relates generally to wireless data devices in general, and to a method and apparatus for soliciting connectivity from wireless data networks, in particular.

2. Related Art

Mobile IP and simple IP are two wireless IP implementations that exist in current wireless networks. Presently, simple IP is more widely used than mobile IP, at least partly because IP addresses are a scarce yet expensive network resource, and simple IP allows the network to dynamically assign IP addresses to wireless data devices. Consider, for example, wireless devices utilizing a CDMA2000® Radio Access Network (RAN) and the like, wherein a Packet Data Serving Node (PDSN) acts as an access gateway, providing both simple IP and mobile IP access. In such CDMA2000 networks, simple IP currently dominates. Typical wireless networks that use simple IP have an inactivity timer, and in the case of CDMA2000 and the like, the inactivity timer is implemented at the PDSN.

The PDSN starts the inactivity timer once it detects that a wireless data device's data traffic stops. When the inactivity timer expires, the network recollects the IP addresses assigned to the wireless data device and may assign it to other wireless data devices as needed. This results in large resource savings on the network side. However the recollection of IP address results in the wireless data device losing data service privilege to the network. This may not be acceptable for a wireless data device that needs to be always-connected such as those designed to receive push services, as push devices may appear to be inactive from the point of view of the inactivity timer, while in fact they may be quietly awaiting push services from push data servers.

In order to meet the always-connected requirement for push devices, one technique has wireless data devices send keep-alive data messages to the push data servers at a fixed interval. The simple IP inactivity timer at the PDSN is thereby refreshed implicitly each time the keep-alive data messages pass through the PDSN. Two problems exist with this technique. First, it may cause extra traffic at the push data server. Second, multiple wireless data devices may send keep-alive messages simultaneously, which may overload the capacity of the wireless data network.

SUMMARY

According to one aspect of the present application, there is provided a connectivity solicitation apparatus for maintaining data connectivity between a wireless device and a wireless data network, the wireless data network having a data inactivity node that tracks the inactivity of the wireless data device using an inactivity timer, the apparatus comprising: a transceiver module that can send and receive user data traffic as well as send solicitation messages to the wireless data network; a processor that can detect data inactivity at said transceiver module; and a control module operating with said processor, adapted to cause a solicitation message to be sent to the wireless data network through said transceiver upon the detection of data inactivity at said transceiver for a predetermined amount of time.

According to another aspect of the present application, there is provided a data switching node governing data connectivity between a wireless data network and a wireless data device, the data switching node comprising: at least one transceiver module that can receive solicitation messages from a connectivity solicitation apparatus; a processor that can detect the data activity of said at least one transceiver module; and a control module operating with said processor, adapted to reset a data inactivity timer on behalf of the wireless data device upon the condition of one of receiving a solicitation message and detecting data activity.

According to yet another aspect of the present application, there is provided a data node capable of communicating with a wireless data network on behalf of a wireless data device, comprising: a transceiver module that can send and receive user data traffic as well as send solicitation messages to the wireless data network; a processor that can detect the data activity of said transceiver; and a control module operating with said processor, adapted to cause solicitation messages to be sent to the wireless data network on behalf of the wireless data device through said transceiver.

According to yet still another aspect of the present application, there is provided a method of controlling the connectivity between a wireless data device and a wireless data network, the wireless data network comprising a data switching node maintaining an inactivity timer corresponding to the wireless data device, the expiration of the inactivity timer causing the wireless data device to be disconnected from the wireless data network, the method comprising the steps of: maintaining a solicitation timer; upon expiry of said solicitation timer, sending a solicitation message to the data switching node; and upon reception of said solicitation message at the data switching node, resetting the inactivity timer at the data switching node.

Other aspects and features of the present application will become apparent to those ordinarily skilled in the art upon review of the following description of specific embodiments of a method and apparatus for soliciting connectivity from wireless data networks in conjunction with the accompanying figures.

DETAILED DESCRIPTION

According to the embodiments of the techniques of this application, a wireless data device or other data node sends solicitation messages periodically to a wireless gateway, such as a PDSN, when there is no data traffic between the wireless data device and a wireless data network. Each solicitation message resets the simple IP inactivity timer on the wireless gateway. When multiple wireless data devices send solicitation messages, the interval between subsequent transmissions of solicitation messages is randomised to reduce the probability of collision with the solicitations from other devices on the same wireless link. The solicitation timer, for instance, may be based on the simple IP inactivity timer setting on the wireless network, and the number of wireless data devices that the wireless data network serves. Expiration of the solicitation timer at the wireless data device or other data node causes the next solicitation message to be sent from or on behalf of the wireless data device.

In some embodiments, the techniques of this application only excise the network between a base station, such as a Base Transceiver Subsystem (BTS) and a wireless gateway, such as a PDSN. No extra traffic is required to be sent on the remainder of the data network in order to keep the wireless data device always connected. When a wireless data device stops using the wireless data connection, the device may tear down the simple IP connectivity either explicitly by sending a termination request or implicitly by not sending any further solicitation messages and relying on the inactivity timer expiration.

The techniques of this application are particularly well suited for use in Personal Digital Assistants, mobile communication devices, cellular phones, and wireless two-way communication devices (collectively referred to herein as "wireless data devices") that have data packet processing capability using the simple IP environment in a wireless network. The techniques of this application provide utility, however, in any device or system that has data packet processing capability using the simple IP environment in a wireless network.

Figure 1:
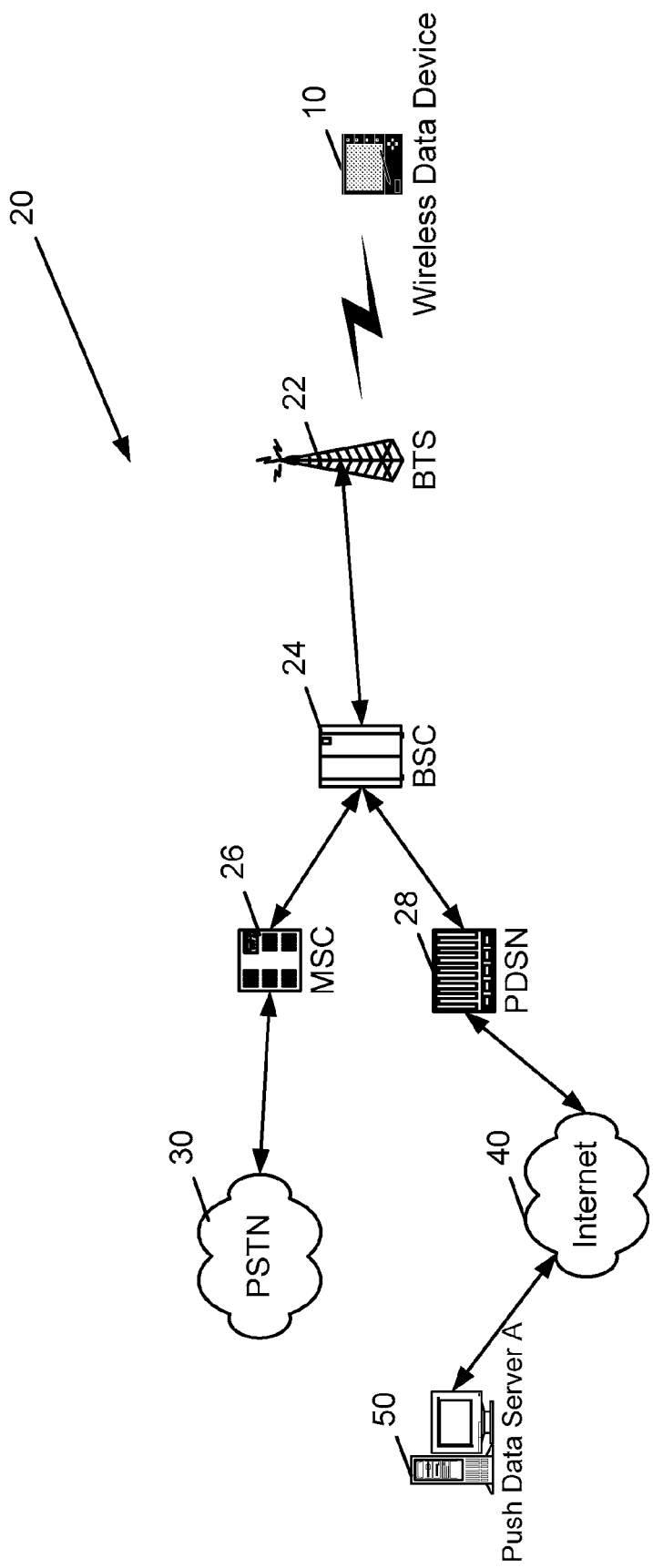
FIG. 1 is a block diagram of an exemplary CDMA2000 wireless data network system with a wireless data device, provided in accordance with the techniques of the present application.

Referring now to the drawings, FIG. 1 is a block diagram of an exemplary CDMA2000 wireless data network system with a wireless data device, provided in accordance with the techniques of the present application. The CDMA2000 wireless data network system includes a wireless device 10, an exemplary 1× Code Division Multiple Access mixed circuit switched and packet switched CDMA2000 network 20, a Public Switched Telephone Network (PSTN) 30, Internet 40 and push data servers 50. The wireless data device 10 is preferably a two-way communication device having data and/or voice communication capabilities. CDMA2000 network 20 includes mixed circuit and packet switched components: the Base Transceiver Subsystem (BTS) 22 and the Base Station Controller (BSC) 24; a circuit switched only component: Mobile Switching Centre (MSC) 26; and a packet switched only component: Packet Data Serving Node (PDSN) 28.

Operationally, wireless device 10 communicates wirelessly with BTS 22 and BSC 24 to gain access to circuit switched services provided by MSC 26—such as voice and Short Message Service (SMS) via PSTN 30. Wireless device 10 also communicates wirelessly with BTS 22 and BSC 24 to gain access to packet data services provided by PDSN 28—such as e-mail, WAP, and other data services via Internet 40.

The CDMA2000 network system of FIG. 1 is meant to be an example only of a system that can embody the techniques of the present application. The techniques can be applied to other wireless data networks such as General Packet Radio Service (GPRS) or Universal Mobile Telecommunication System (UMTS), without departing from the spirit of the present application.

Figure 2:
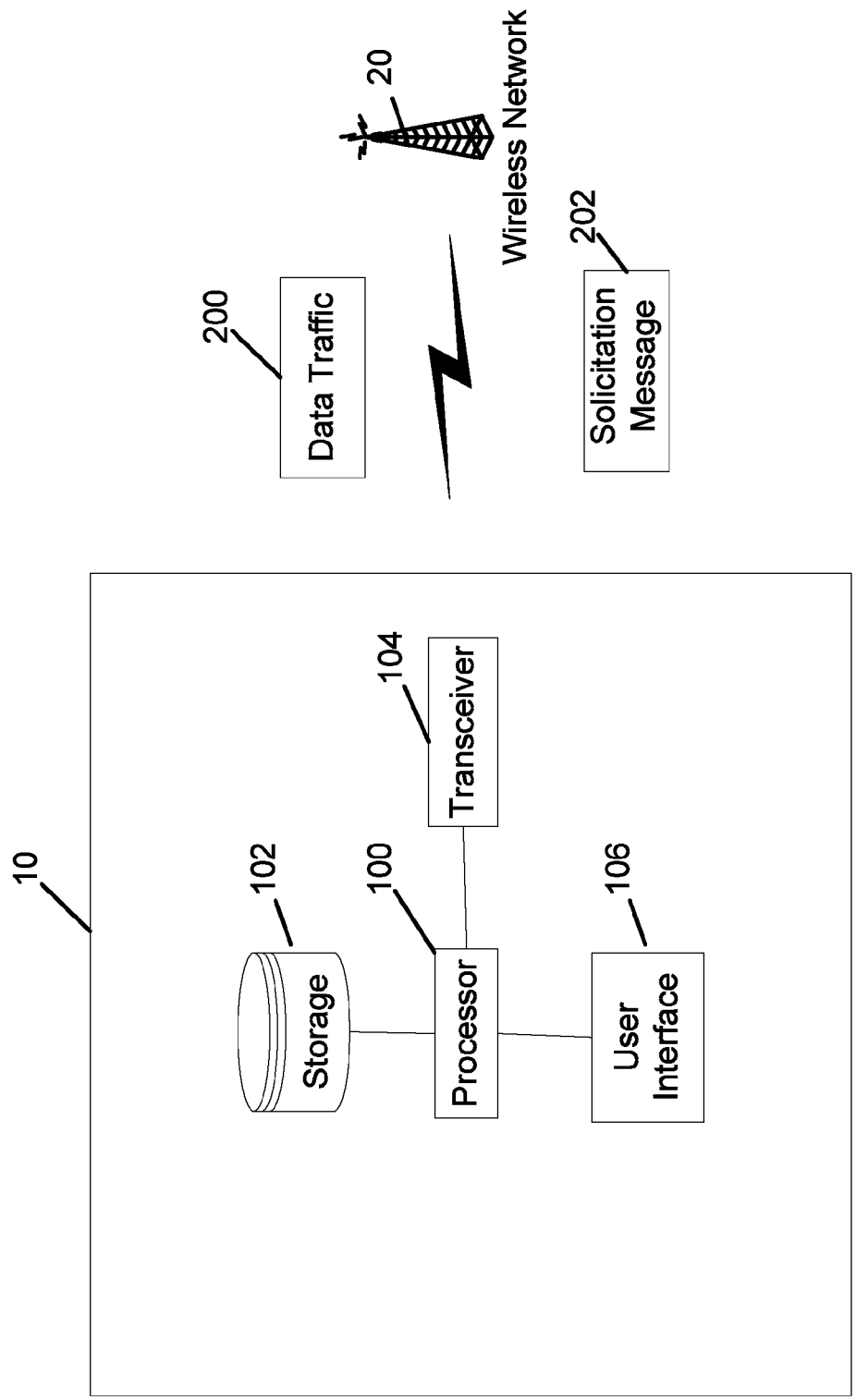
FIG. 2 is a block diagram showing in further detail the exemplary wireless data device of FIG. 1.

FIG. 2 is a block diagram showing in further detail the exemplary wireless data device of FIG. 1. The wireless data device 10 is preferably a two-way communication device having at least data or data/voice communication capabilities. Where the device 10 is enabled for two-way communications, the device incorporates a processor 100, a storage subsystem 102, a transceiver subsystem 104 and a user interface module 106. A control module within the microprocessor 100 controls the overall operation of the wireless data device. Communication functions, including signalling and user traffic between wireless data device 10 and wireless network 20 are performed through the transceiver subsystem 104. The processor 100 also interacts with further device subsystems such as the storage subsystem 102 and the user interface module 106. In order to prevent the network terminating the wireless device's data connectivity by dropping the wireless device's assigned simple IP address, wireless data device 10 sends a Solicitation Message 202 after data traffic 200 activity stops and before the network inactivity timer expires. This will be further explained in FIG. 3.

A predetermined set of applications that control basic device operations, including at least data communication applications for example, are normally installed on the device 10 during manufacture. A set of applications that may be loaded onto the device includes, but is not limited to, e-mail, calendar events, appointments, browser and task items. Such applications send and receive data items, via the CDMA2000 network 20 and Internet 40, to and from push data server 50. For voice communications, device 10 communicates with PSTN 30 via the CDMA2000 network 20.

Figure 3:
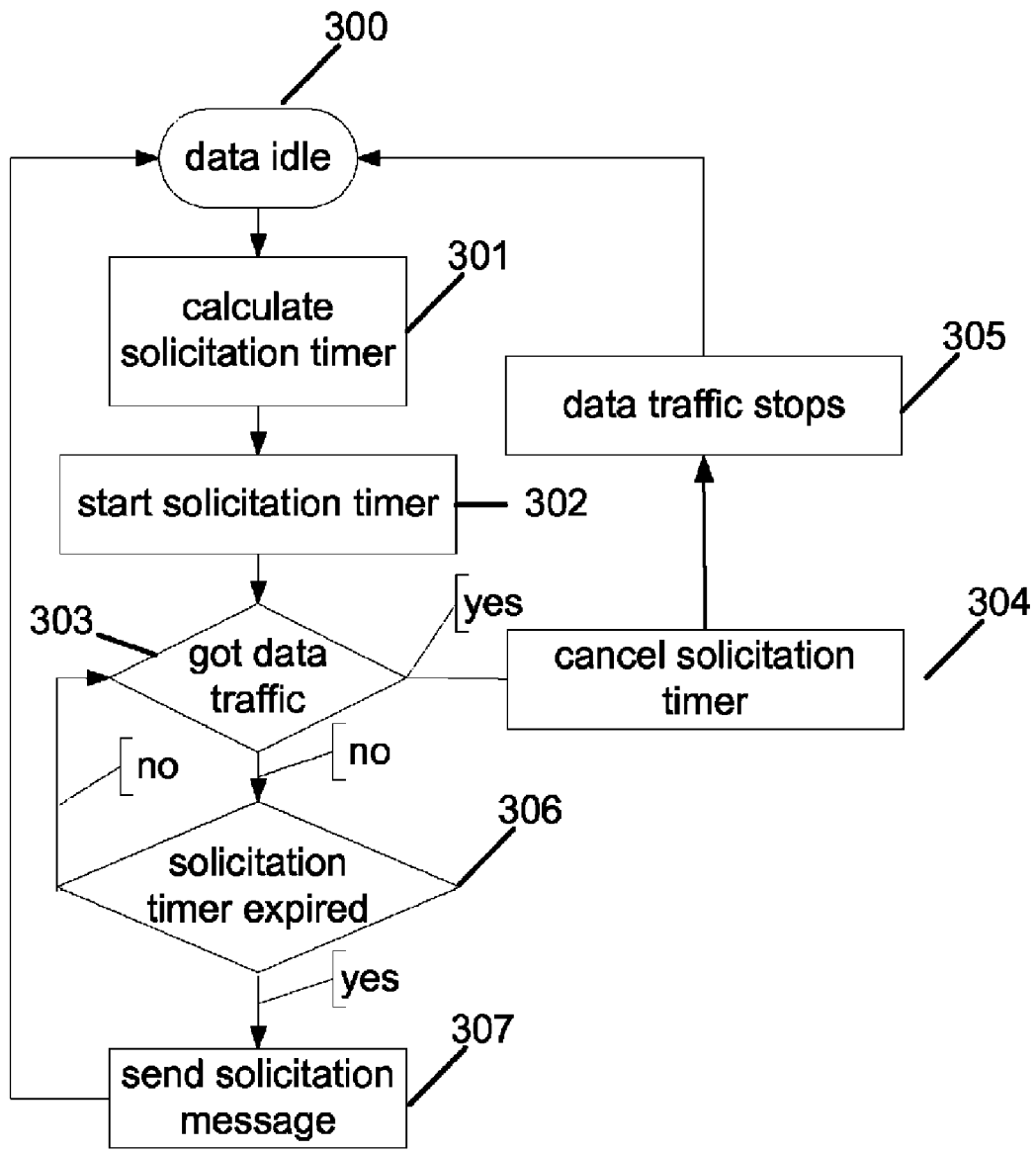
FIG. 3 shows a data flow diagram in accordance with one embodiment of the present techniques of this application.

Now referring to FIG. 3, FIG. 3 shows a data flow diagram in accordance with one embodiment of the present techniques of this application. Whenever the wireless data device enters data idle state 300, a solicitation timer is calculated 301 and started 302. The value of the solicitation timer may be based on factors such as the simple IP inactivity timer setting on the wireless network and/or the number of wireless data devices served in the wireless data network and/or the duration of a Dynamic Host Configuration Protocol (DHCP) lease for the IP address of the wireless data device. The preferred value for the solicitation timer is any value that guarantees that the simple IP inactivity timer never expires. A further preferred value for the solicitation timer minimizes the solicitation traffic between wireless data device 10 and wireless data network 20. It is also desired that the interval between the subsequent transmissions of solicitation messages 202 is randomized to reduce the probability of multiple wireless data devices 10 sending solicitation messages 202 to wireless data network 20 at the same time, resulting in an overload of the wireless data network 20. If data traffic arrives 303 before a solicitation timer expires, the solicitation timer is cancelled 304. After the data traffic stops 305 and wireless data device 10 enters data idle state 300, another solicitation timer value is chosen 301 and the solicitation timer is started again 302. Whenever the solicitation timer expires 306, a Solicitation Message 202 is sent 307 to the wireless data network 20. Otherwise wireless data device continues to check if data traffic arrives 303. Once a Solicitation Message 202 is sent 307, wireless data device 10 enters data idle state 300 again; which results in another solicitation timer being calculated 301 and started 302. This process loops forever until the user shuts down the wireless data device 10, or otherwise disables the always-connected nature of the device 10, such as by turning off the radio.

In an alternate embodiment, the push data server 50 can also send solicitation message 202 to PDSN 28 on wireless data device 10's behalf. Once wireless data device 10 is powered on and communicating with wireless data network 20, wireless data device 10 notifies its simple IP address to push data server 50, after which data traffic is exchanged between wireless data device 10 and push data server 50. When the data traffic stops between wireless data device 10 and push data server 50, push data server 50 starts a solicitation timer in an analogous way as described in FIG. 3. When the solicitation timer expires, push data server 50 sends a solicitation message 202 to the PDSN 28 that the device is registered with. The time interval between the consecutive solicitation messages can be pre-configured at the push data server 50 according to the network settings. For instance, push data server 50 may contain a database in which are recorded the inactivity timer value of each network. The time interval between the consecutive solicitation messages can also be based on the network information obtained by the wireless data device 10 after it communicates to the wireless data network 20. The wireless data device 10 reports to the push data server 50 all the network information under which it is currently registered. The advantage of this alternate embodiment is that since wireless data devices do not have to send solicitation messages, battery life is extended at the wireless data devices.

Figure 4:
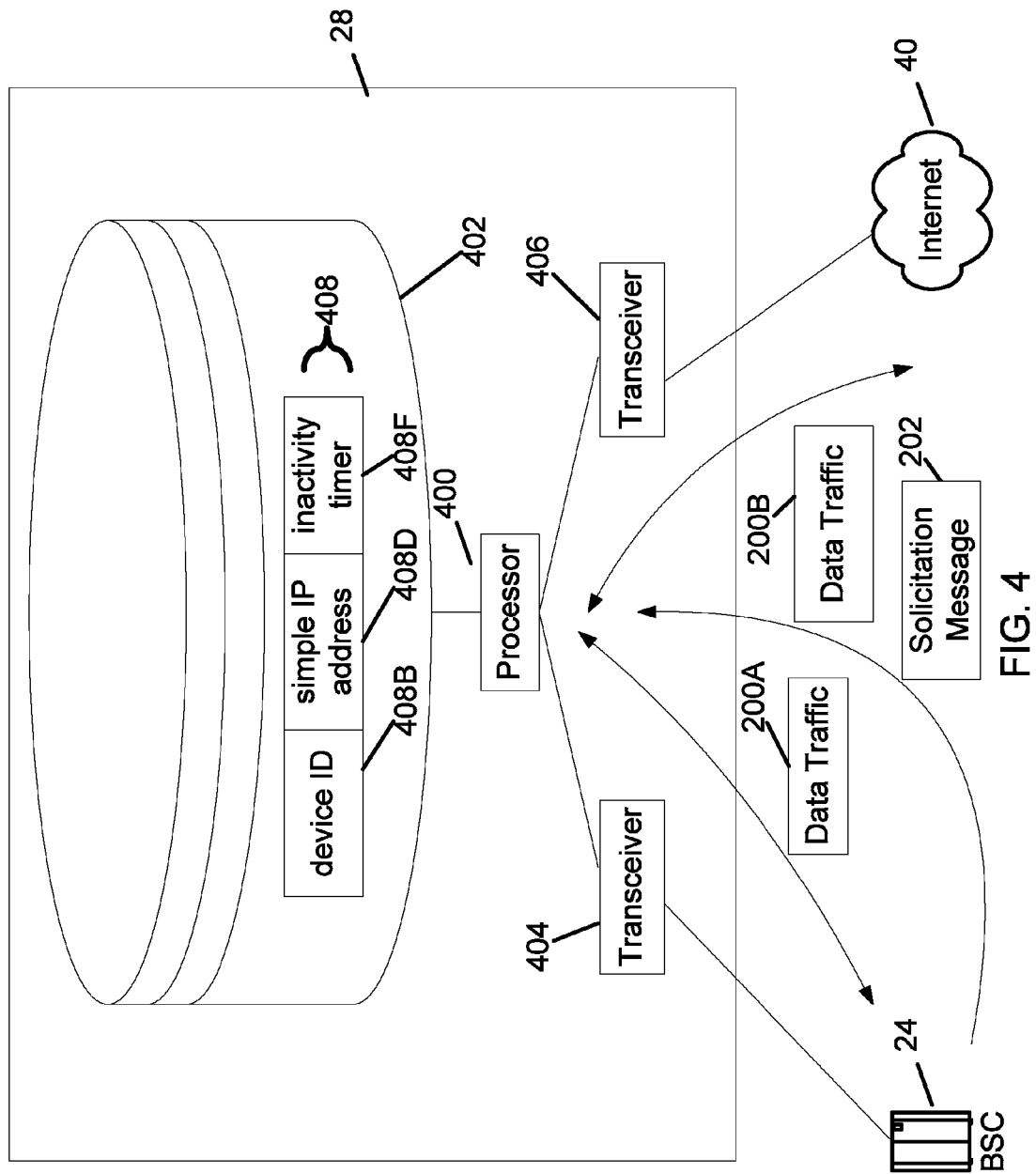
FIG. 4 is a block diagram showing further details of the exemplary PDSN of FIG. 1.

FIG. 4 is a block diagram showing further details of the exemplary PDSN of FIG. 1. Operationally it includes a processor 400, a storage subsystem 402, and two transceiver interfaces 404 and 406. The first transceiver interface 404 is used to receive Solicitation Message 202 from wireless data device 10 via BSC 24 and carry two way communication Data Traffic 200A between wireless data device 10 and PDSN 28. The second transceiver 406 is used to carry two-way communication Data Traffic 200B between PDSN 28 and push data server 50. Storage subsystem 402 has optional system record 408. Each row of the system record 408 represents all information for one wireless data device 10 and includes a device ID 408B or similar means of identifying at least one wireless data device 10, device simple IP address 408D, as well as device inactivity timer 408F associated with wireless data device 10. Processor 400 includes a control module that controls overall operation of PDSN 28. When Data Traffic 200A, 200B for wireless data device 10 arrives at PDSN 28 via transceiver interface 404, 406, the control module of processor 400 examines its system record 408 stored in storage subsystem 402 and stops inactivity timer 408F associated with that wireless data device ID 408B. Conversely when Data Traffic 200A, 200B stops arriving at PDSN 28 for wireless data device 10 via transceiver interface 404, 406, the control module of processor 400 examines its system record 408 stored in storage subsystem 402 and resets and starts inactivity timer 408F associated with that wireless data device ID 408B. When the inactivity timer 408F associated with that wireless data device ID 408B expires, processor 400 invalidates the simple IP address 408D associated with that wireless data device ID 408B, after which wireless data device 10's data connectivity is terminated. In order to prevent this from happening, wireless data device 10 sends Solicitation Message 202 periodically to PDSN 28 via transceiver interface 404 when there is no data traffic between wireless data server 50 and wireless device 10. When PDSN 28 receives Solicitation Message 202, the processor 400 examines its system record 408 stored in storage subsystem 402, if the simple IP address 408D associated with that wireless data device ID 408B is still valid, the control module of processor 400 will reset the inactivity timer 408F on behalf of wireless data device 10 which has an associated device ID 408B. This is further explained in FIG. 5.

In practice, one PDSN usually serves multiple wireless data devices. Therefore PDSN may contain multiple system record 408, one for each wireless data device 10.

Figure 5:
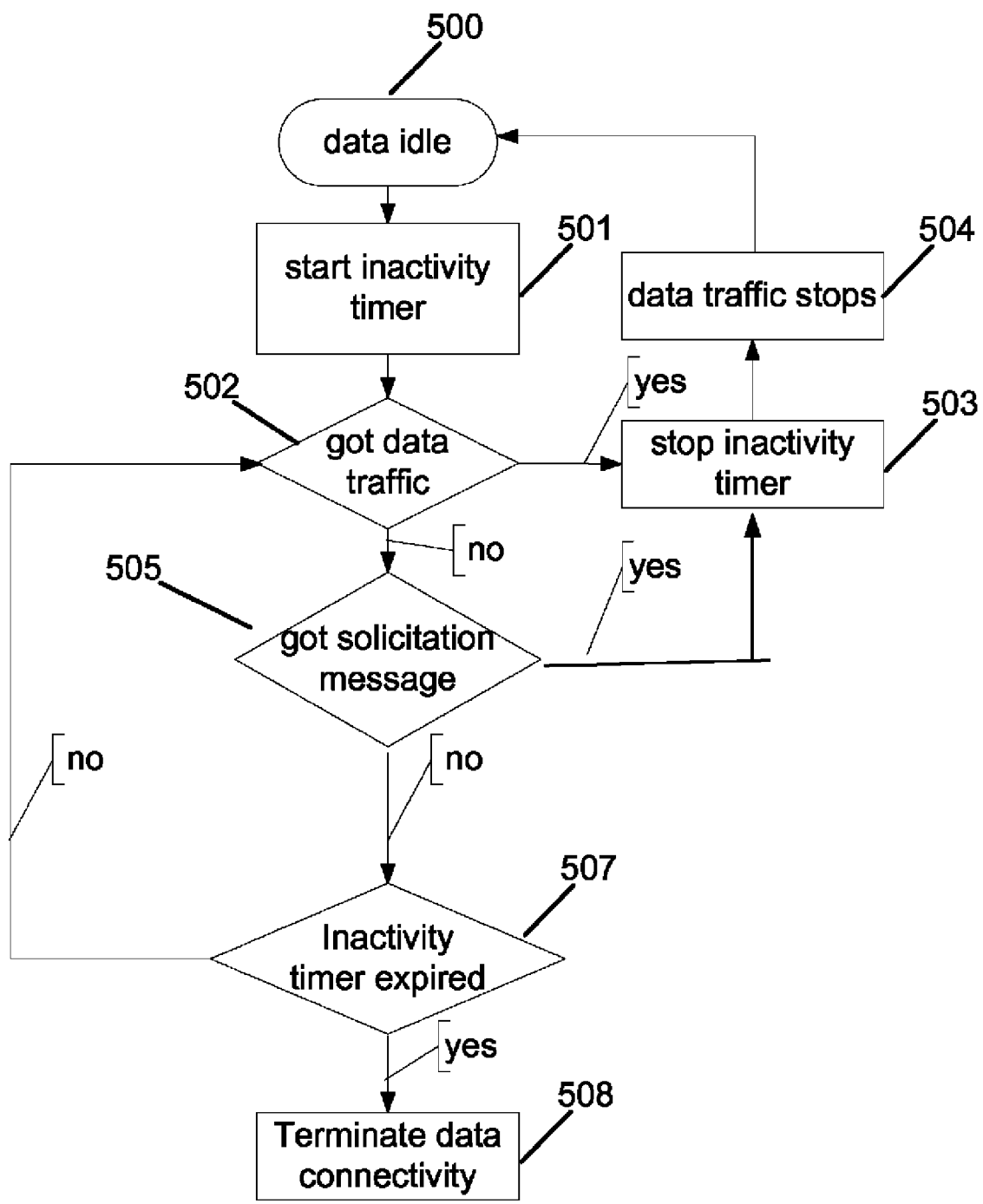
FIG. 5 shows a data flow diagram in accordance with another embodiment of the present techniques of this application.

FIG. 5 shows a data flow diagram in accordance with another embodiment of the present techniques of this application. Whenever the data activity of wireless data device 10 at PDSN 28 enters data idle state 500, PDSN 28 starts an inactivity timer 501. If data traffic arrives 502 before the inactivity timer expires, PDSN 28 stops inactivity timer 503. When the data traffic stops 504 at PDSN 28, wireless data device 10 at PDSN 28 enters data idle state 500, and PDSN 28 starts another inactivity timer 501. If PDSN 28 receives a solicitation message 505 and before the inactivity timer expires, PDSN 28 stops the inactivity timer on wireless data device 10's behalf. Whenever the inactivity timer expires 507, PDSN 28 terminates the data connectivity 508 of wireless data device 10 by invalidating its assigned simple IP address. Otherwise PDSN 28 continues to monitor whether data traffic arrives 502 or it receives a solicitation message 505.

Figure 6:
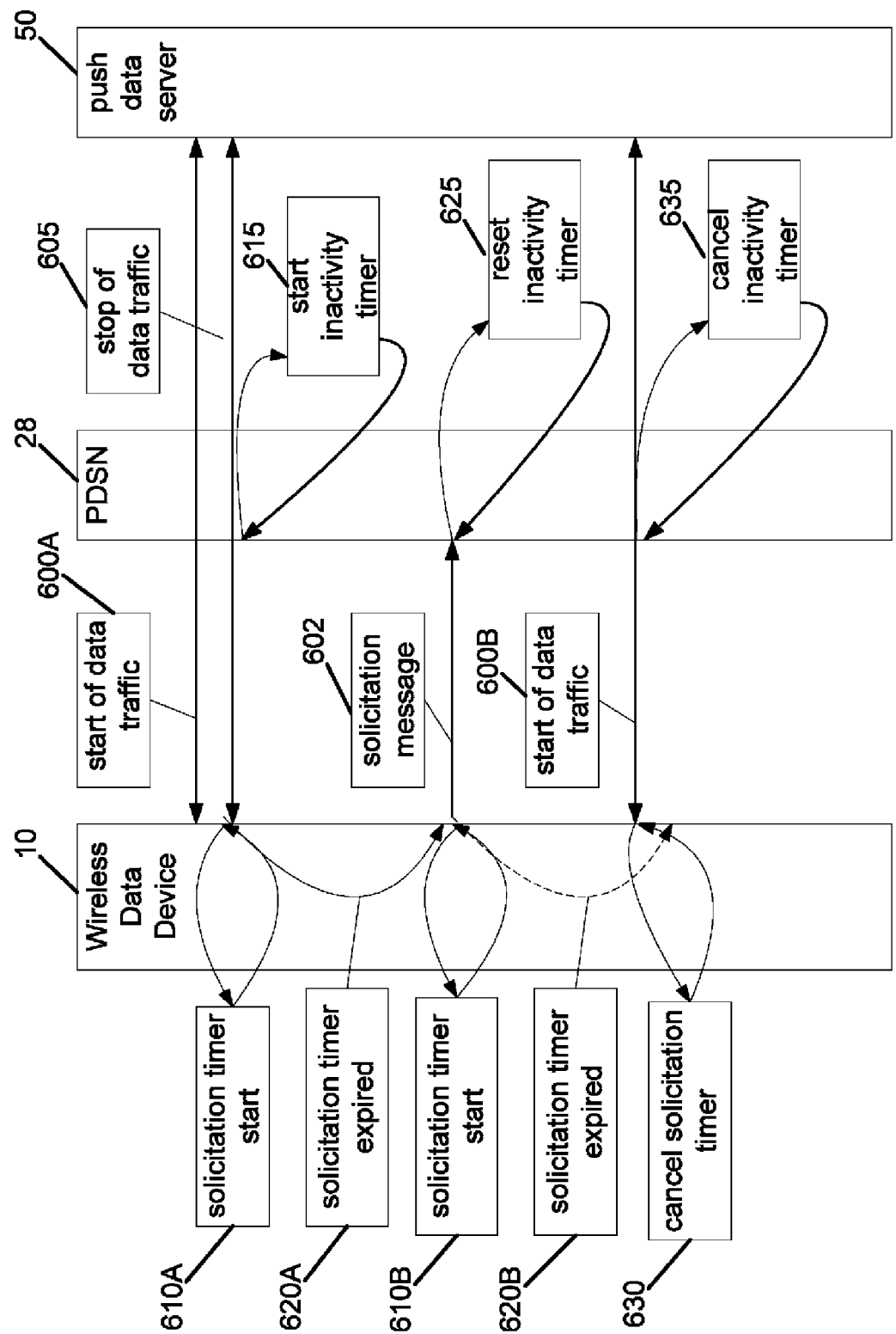
FIG. 6 illustrates in greater detail the signalling and data flow among the wireless data device, PDSN and push data servers in accordance with the embodiment of a method of the present techniques of this application.

FIG. 6 illustrates in greater detail the signalling and data flow among the wireless data device, PDSN and push data servers in accordance with the embodiment of a method of the present techniques of this application. Data Traffic flows between wireless data device 10 and push data server 50 in the time interval between start of data traffic 600A and stop of data traffic 605. When stop of data traffic 605 event occurs, solicitation timer start 610A is triggered within wireless data device 10. At the same time, those skilled in the art know that an inactivity timer start 615 is also triggered at PDSN 28 too. The value of inactivity timer is predetermined. The value of the solicitation timer setting is detailed in FIG. 3 and is less than the inactivity timer value setting. When the solicitation timer expires 620A, a solicitation message 602 is sent to PDSN 28. PDSN 28 will reset inactivity timer 625 after receiving a solicitation message 602 from wireless data device 10. Another solicitation timer start 610B is triggered at wireless data device 10 at the same time. Suppose a start of data traffic 600B is detected before the solicitation timer expiry 620B occurs, wireless data device 10 does a cancellation of the solicitation timer 630 while the PDSN 28 does a cancellation of inactivity timer 635.

Figure 7:
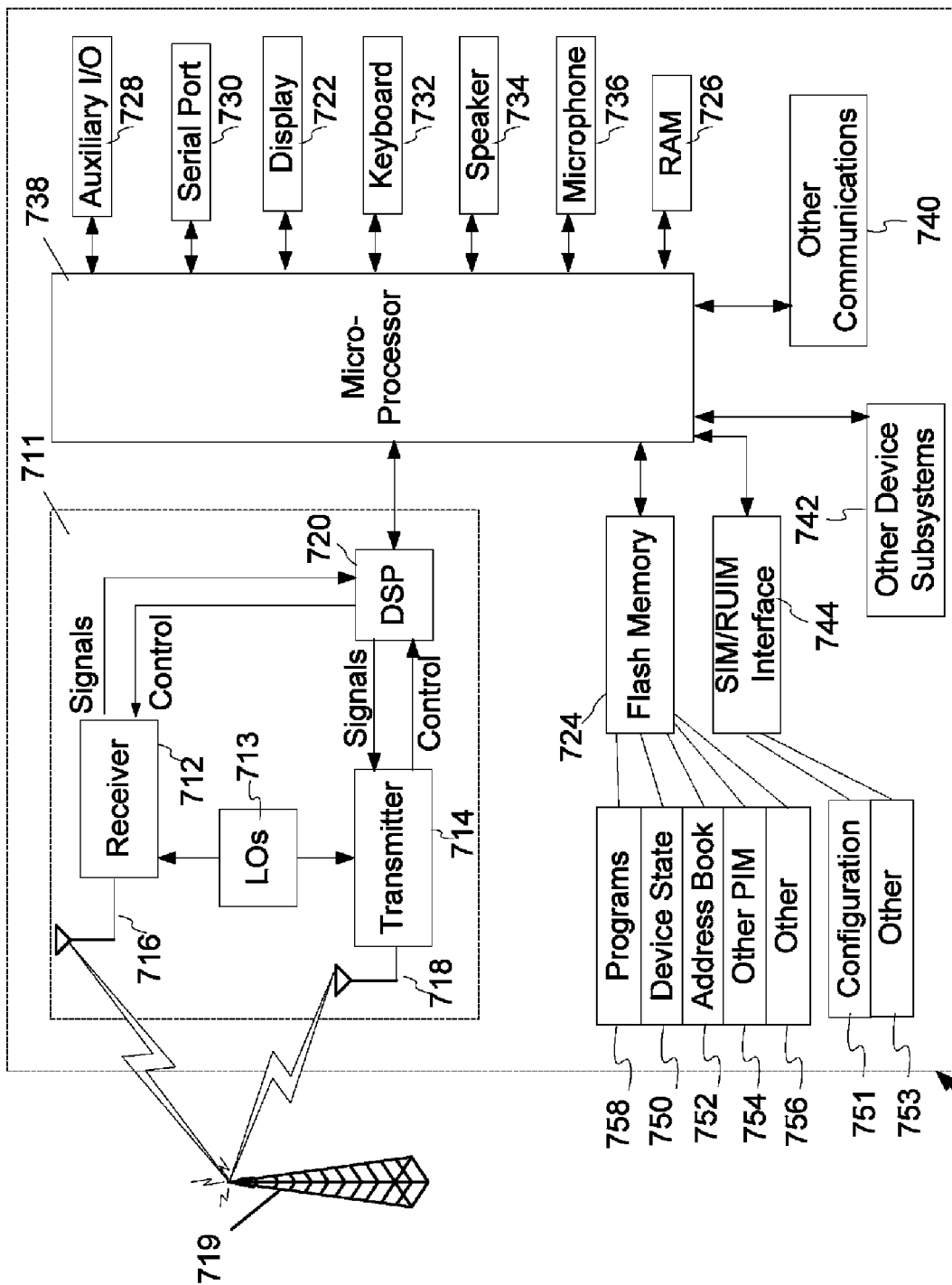
FIG. 7 is a block diagram illustrating a mobile station apt to be used with preferred embodiments of the apparatus and method of the present application The same reference numerals are used in different FIGs. to denote similar elements.

Referring to the drawings, FIG. 7 is a block diagram illustrating a mobile station apt to be used with preferred embodiments of the apparatus and method of the present application. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, EDGE network or CDMA network.

Network access requirements will also vary depending upon the type of network 719. For example, in the Mobitex and DataTAC networks, mobile station 700 is registered on the network using a unique identification number associated with each mobile station. In UMTS and GPRS networks, and in some CDMA networks, however, network access is associated with a subscriber or user of mobile station 700. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 700 will be unable to carry out any other functions involving communications over the network 700. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile station 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, other communication subsystem 740 such as a short-range communications subsystem and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile station user's corresponding data items stored or associated with a host computer system. Further applications may also be loaded onto the mobile station 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

It is envisaged that, in addition to resetting the inactivity timer, a solicitation message optionally causes any Dynamic Host Configuration Protocol (DHCP) leases associated with the IP address of the wireless device to be renewed. This can be accomplished by adapting the data node which receives solicitation messages, such as a PDSN, to send a renew lease message to the DHCP server that configured the IP address, the renew lease message being sent upon reception of a solicitation message at the PDSN.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A data node for sending messages to cancel inactivity timers in a wireless network on behalf of a wireless device, comprising:
    a transceiver module configured to send and receive user data traffic as well as send solicitation messages on behalf of the wireless device to the wireless network;
    a processor configured to detect the data activity of said transceiver; and
    a control module operating with said processor, configured to cause solicitation messages to be sent to the wireless network on behalf of the wireless device through said transceiver, the control module configured to:
        start a solicitation timer upon detection of the absence of data traffic involving the wireless device;
        wait for the solicitation timer to expire;
        cancel the solicitation timer upon detection of data traffic involving the wireless data device;
        send a message to the wireless network upon expiry of said solicitation timer; and
        wait for the wireless network to acknowledge receipt of the message,
    wherein the data node is a push data server.

2. The node of claim 1, where in use the node is connected to the wireless network and is arranged to send messages to the wireless network but not the wireless device.

3. The node of claim 1, wherein the wireless network has a data inactivity node that tracks the inactivity of the wireless device using an inactivity timer, and
    wherein the processor can detect data inactivity at said transceiver module;
    and
    the control module operating with said processor is configured to cause a message to be sent to the wireless network on behalf of the wireless device through said transceiver upon the detection of data inactivity at said transceiver for a predetermined amount of time.

4. The node of claim 1, wherein the wireless network is selected from the group consisting of Mobitex, Datatac, CDMA, GPRS, and UMTS wireless networks.

5. The node of claim 1 wherein the control module is further configured to:
    detect the presence of data activity between said wireless device and a data node; and
    cancel the solicitation timer (304).

6. The node of claim 1, wherein the message is sent at a time that is randomized to minimise the wireless network load.

7. The node of claim 1, wherein the solicitation timer value is less than or equal to the value of the inactivity timer.

8. The node of claim 7, wherein the solicitation timer value is randomised to minimize the wireless network load.

9. The node of claim 1, wherein the data connectivity uses simple IP.

10. A method of controlling the connectivity between a wireless device and a wireless network, the wireless network comprising a data switching node maintaining an inactivity timer corresponding to the wireless device, the expiration of the inactivity timer causing the wireless device to be disconnected from the wireless network, the method comprising:
    maintaining a solicitation timer at a data node;
    starting the solicitation timer upon detection of the absence of data traffic involving the wireless device;
    cancelling the solicitation timer upon detection of data traffic involving the wireless device;
    upon expiry of said solicitation timer, sending a message from the data node on behalf of the wireless device to the data switching node; and
    upon reception of said message at the data switching node, resetting the inactivity timer at the data switching node.

11. The method as claimed in claim 10, further comprising the step of detecting data traffic involving the wireless device.

12. The method as claimed in claim 11, further comprising the steps of stopping the inactivity timer upon detection of the data traffic.

13. The method of claim 10, further comprising the steps of detecting the absence of data traffic involving the wireless device.

14. The method of claim 13, further comprising the steps of starting the solicitation timer upon detection of the absence of data traffic.

15. The method of claim 13, further comprising the steps of starting the inactivity timer upon detection of the absence of data traffic.

16. The method of claim 10, further comprising the step of calculating the value of the solicitation timer as a function of the value of the inactivity timer.

17. The method of claim 16, wherein the solicitation timer value is less than the inactivity timer value to keep the wireless device always connected to the wireless network.

18. The method of claim 16, wherein the solicitation timer value is greater than the inactivity timer value to terminate the wireless device connectivity to the wireless network.

19. The method of claim 16, wherein the value of the inactivity timer is offset from at least one other inactivity timer corresponding to at least one other wireless device to minimize wireless network load.

20. The method of claim 10, wherein the wireless network is selected from a CDMA network and a GPRS network.

21. The method of claim 20, wherein the data switching node is selected from a packet data switching node; a GPRS switching node; a gateway GPRS switching node; and a serving GPRS switching node.

22. The method of claim 10, wherein the connectivity uses simple Internet Protocol.

23. A method of operating a data node for sending messages to cancel inactivity timers in a wireless network on behalf of a wireless device, the node being a push data server and comprising a transceiver module that can send and receive user data traffic, the method comprising:
    detecting data activity of said transceiver;
    starting a solicitation timer upon detection of the absence of data traffic involving the wireless device;
    waiting for the solicitation timer to expire;
    cancelling the solicitation timer upon detection of data traffic involving the wireless device;
    sending a message to the wireless network upon expiry of said solicitation timer;
    waiting for the wireless network to acknowledge receipt of the message; and
    sending messages to the wireless data network on behalf of the wireless device through said transceiver.

24. The method of claim 23, wherein the message is not sent to the wireless device.

* * * * *